May 3, 1960          B. J. CHROMY          2,934,993
DEVICE FOR OPTICAL EXAMINATION OF GEM MATERIALS
Filed Nov. 18, 1955          2 Sheets-Sheet 1
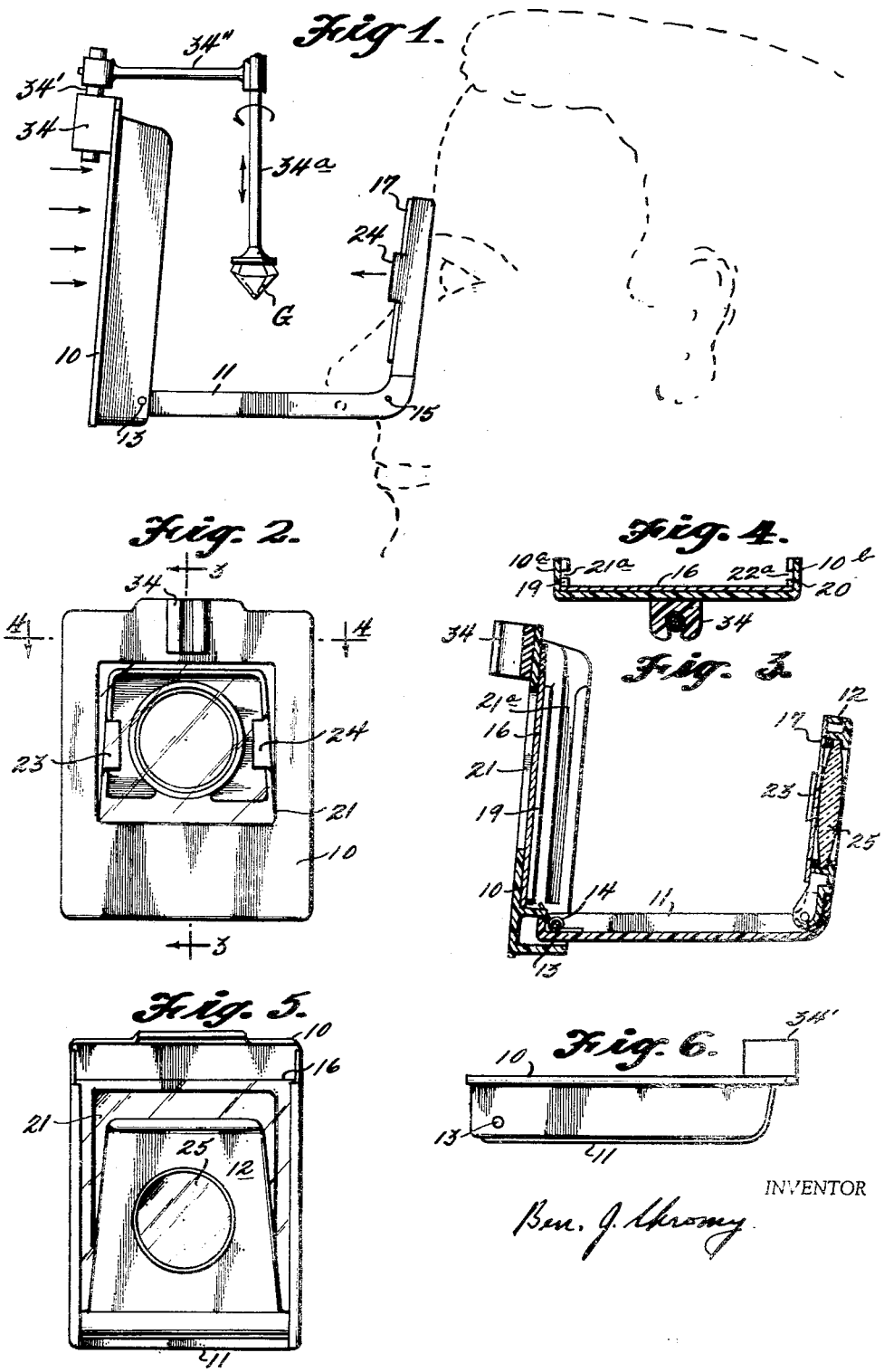
INVENTOR
Ben. J. Chromy

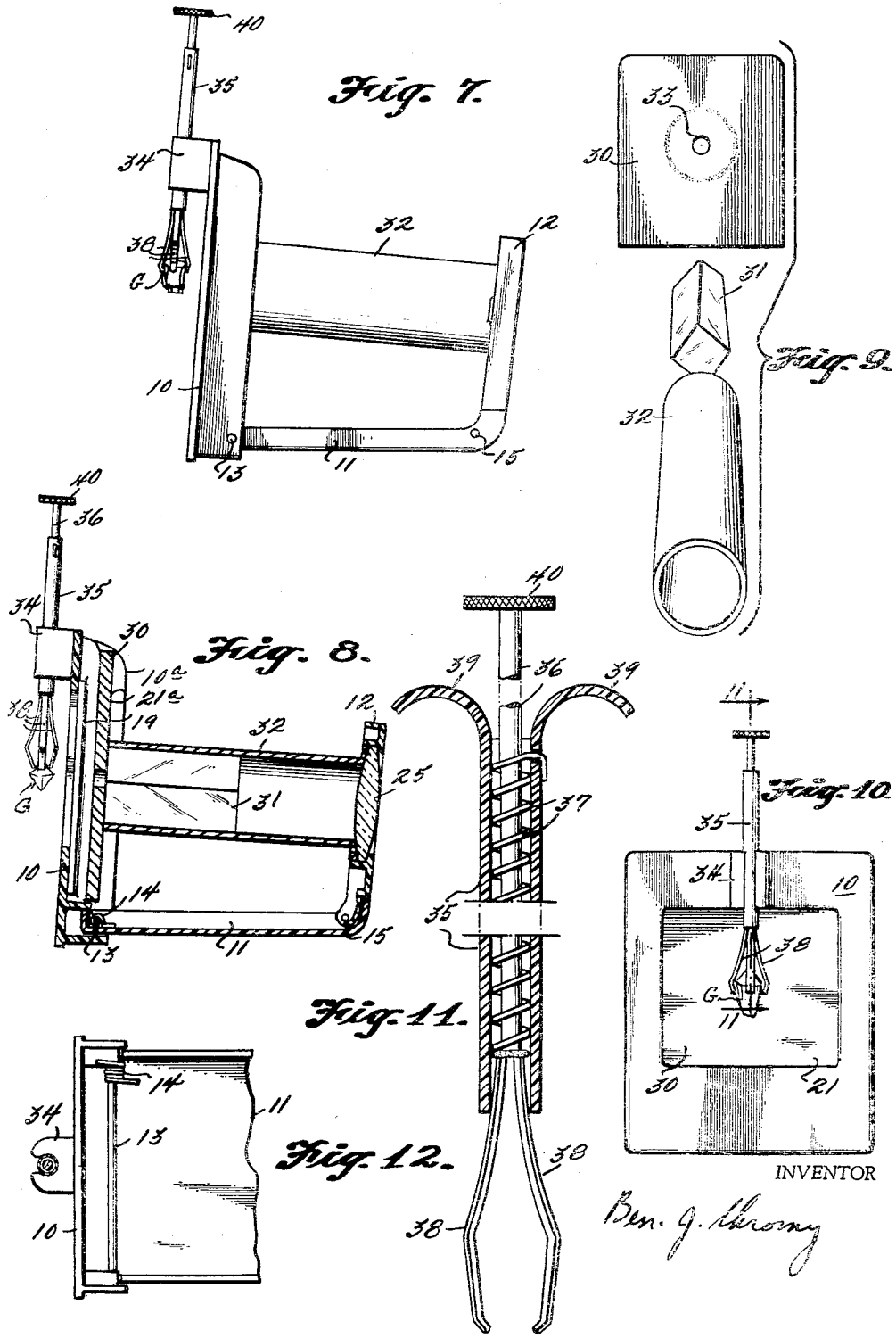

2,934,993

DEVICE FOR OPTICAL EXAMINATION OF GEM MATERIALS

Benjamin J. Chromy, Washington, D.C.

Application November 18, 1955, Serial No. 547,637

5 Claims. (Cl. 88—14)

This invention relates to a device for examining transparent or translucent minerals, gems and gem materials.

An object of this invention is to provide an improved device for the optical examination of transparent or translucent crystalline minerals or gem materials to determine the crystalline or amorphous nature thereof.

Another object of this invention is to provide an improved device that may be employed either as a polariscope or as a dichroscope.

Still another object of this invention is to provide an improved optical device that may be constructed efficiently and inexpensively for student use in the study of transparent or translucent gem materials to determine some of the optical properties thereof.

Other objects of this invention will be apparent to those skilled in the art to which it relates from the following specification and claims.

In accordance with this invention there is provided a compact and inexpensive device that is very useful for examining transparent or translucent gem materials and finished gems to determine whether they are singly or doubly refractive. Also in the case of transparent or translucent colored doubly refractive gem materials or finished gems this device may be employed for observing the pleochroic colors thereof. This device is therefor useful for the purpose of separating amorphous gem materials, such as, glass, and those crystallizing in the isometric system from those crystallizing in the other five crystal systems.

Briefly this device comprises a foldable viewing device which is made so that either a pair of light polarizing elements, such as, "Polaroid" sheets or a calcite rhomb supported on an aperture plate may be placed into the viewing device whereby it may be used either as a polariscope or as a dichroscope.

Referring to the drawing briefly,

Fig. 1 is a side view of this invention adapted for use as a polariscope;

Fig. 2 is a front view of the instrument shown in Fig. 1;

Fig. 3 is a sectional view taken along the line 3—3 of Fig. 2;

Fig. 4 is a sctional view taken along the line 4—4 of Fig. 2;

Fig. 5 is a view of this instrument as seen from the eye piece end;

Fig. 6 is a side view showing the frame of this instrument folded;

Fig. 7 is a side view of this invention adapted for use as a dichroscope;

Fig. 8 is a longitudinal sectional view of the device shown in Fig. 7;

Fig. 9 is an exploded view of the removable dichroscope elements of the device;

Fig. 10 is a front view of the device shown in Fig. 7;

Fig. 11 is a sectional view of the gem gripping tweezers employed as shown in Fig. 7 and Fig. 12 is a detail fragmentary view showing how the tweezers are clamped to the front of the frame.

Referring to the drawing in detail there is shown in Fig. 1 a side view of this device being used as a polariscope. For this purpose the frame of the device comprising the member 10, the back member 11 and the eye piece 12 are opened up from the folded position such as shown in Fig. 6 to the open position shown in Fig. 1. The forward end of the back member 11 is attached to the front member by the pivot pin 13 which extends through suitable apertures formed in these members and functions to hold these two members in assembled relation. This pivot pin is partially surrounded by a coil spring 14 as shown in Fig. 3 and the ends of this spring bear against surfaces of the members 10 and 11 respectively so as to apply pressure against these members tending to hold them in open position as shown in Fig. 3. The eye piece 12 is pivotally attached to the other end of the back member 11 by means of the pivot pin 15 as shown in Figs. 1 and 3 so that the eye piece may be folded into the back 11 and when thus folded the back and eye piece may be folded into the front member 10 between the side panels 10a and 10b thereof, thus forming a compact device as shown in Fig. 6.

After the device is unfolded, light polarizing elements 16 and 17, which may be small sheets of material sold under the name "Polaroid," are positioned therein and these elements are arranged so that light passing into the device from the front as shown by the arrows 18 in Fig. 1 are plane polarized after passing through the element 16. The element 17 is crossed with reference to the light polarizing element 16 so that the plane polarized light emerging from the element 16 is ordinarily stopped at the element 17 by the light polarizing property of the latter.

The side panels 10a and 10b of the front member 10 are provided with a pair of inwardly extending elongated projections 19 and 20 as shown in Fig. 4 which are employed for the purpose of holding the light polarizing element 16 over the cut away portion 21 of the front member 10. These projections 19 and 20 are arranged so that the polarizing element may be slipped into the back member 10 and frictionally held in place thereby. A set of channels 21 and 22, also shown in Fig. 4, may be employed for receiving and holding the polarizing element if desired.

A pair of cleat elements 23 and 24 are attached to the eye piece 12 for the purpose of supporting the light polarizing element 17 adjacent to the inner surface of the lens 25 which is also supported by the eye piece 12.

The light polarizing element or sheet 16 is made to have a width dimension equal to the distance between the grooves 19 and 20 in the side panels 10a and 10b, respectively, which is somewhat less than the length of the element so as to prevent the improper positioning and orientation of the element 16 in the front member 10. This is also true of the polarizing element 17 which also has a width less than its length so that it must always be inserted with its width dimension between the cleats 23 and 24. As a result these elements 16 and 17 can only be inserted into the device oriented with their light polarizing directions at right angles, that is, crossed so that they function as crossed Nicol prisms. In other words the element 16 functions as a polarizer and the element 17 as an analyzer.

When they are arranged in this fashion the device is adapted for use as a polariscope as shown in Fig. 1 wherein a gem G to be examined is cemented to a short stick 34a with beeswax. The gem G and stick 34a are rotatably supported by the bracket 34″ which in turn is supported by the rod 34′ that is clamped by the jaws of the clamp 34 that is attached to the top of the front member 10. The gem is rotated and tilted slowly between the light polarizing elements while it is being observed through the eye piece and while the device is pointed toward a source of light, so that the gem may be examined along different directions which may correspond to the different crystallographic axes thereof if the gem is in fact made of doubly refractive gem material. Care must of course be exercised so that the observer is not misled by so called anomalous double refraction introduced into gems made of material, such as, glass, by stresses and strains. However, this will not mislead the careful observer because the optical patterns or effects produced thereby are different from those encountered in doubly refractive crystallized materials.

This instrument may therefor be used to separate gems into two groups, that is, those that are not doubly refractive including those that are amorphous, namely glass, and those crystallizing in the isometric system, such as, diamond, spinel, garnet, etc., and those that are doubly refractive which includes those crystallizing in the hexagonal system (quartz, tourmaline, apatite, beryl, etc.) the tetragonal system (zircon, idocrase, etc.) the orthorhombic system (topaz, danburite, and andalusite, etc.) the monoclinic system (epidote, orthoclase feldspars, etc.) and the triclinic system (kyanite, axinite, plagioclase feldspars, etc.)

Referring to Fig. 7 there is shown a side view illustrating the manner in which this device is arranged to function as a dichroscope. When so used the light polarizing elements 16 and 17 are removed and the assembly comprising the aperture plate 30, calcite rhomb 31 and opaque plastic tube 32 is inserted into the front member 10 in such a way that the side edges of the aperture plate 30 rest in the grooves 21 and 22 shown in Fig. 4 and the free end of the opaque plastic tube 32 is adjacent to the lens 25 of the eye piece 12 as shown in Fig. 8.

The aperture plate 30, calcite rhomb 31 and opaque plastic tube 32 are shown in the exploded view Fig. 9 and these elements are assembled by cementing the calcite rhomb over the aperture 33 of the plate 30 and thereafter cementing the opaque plastic tube 32 to the plate 30 so that this tube surrounds the calcite rhomb 31. The calcite rhomb 31 must be positioned over the aperture 33 so that this aperture appears double when it is viewed through the calcite rhomb. This, of course, is due to the wide difference between the values of the refractive indices of calcite for the ordinary and the extraordinary rays. The two images of the aperture 33 viewed through the calcite 31 and the lens 25 correspond to the ordinary and extraordinary light rays.

A tweezer clamp 34 is attached to the outer surface of the front member 10 and this clamp is provided with a pair of jaws which resiliently grip the tubular member 35 of the tweezers which are employed for the purpose of supporting the gem material in front of the aperture 33 as shown in Figs. 7, 8 and 10.

The tweezers comprise a tubular member 35, an actuating member 36 which is spring biased by the coil spring 37 and to which are attached the spring jaws 38 that grip the gem stone or fragment of gem material. A pair of finger grips 39 are formed out of the split end of the tube 35 by bending the end portions thereof in opposite directions back over the body of the tube. These grips are provided for the purpose of facilitating use of the tweezers. The tweezers are gripped between the forefinger, index finger and thumb and pressure is applied to the thumb pad 40 so that the gem gripping elements 38 are pushed out of the tube 35 and permitted to open whereby a gem may be clamped therebetween as shown in Figs. 7 and 8, when pressure on the thumb pad 40 is released. With the gem thus held in the spring jaws 38, the tweezers are inserted into the clamp 34 by pressing the tube 35 between the jaws of the clamp. The tweezers and gem supported thereby may be rotated while held in this clamp so that light may pass through the gem in different directions while it is examined through the dichroscope. During this procedure the observer notes whether or not both of the images of the aperture 33 are the same color. If this is the case no matter what the orientation of the gem before the aperture may be then the gem is isotropic indicating that it is either colored glass or one of the minerals crystallizing in the isometric system.

Colored gems made of transparent or translucent minerals crystallizing in the other five systems all show pleochroism to a certain extent when examined in directions other than along their optic axes. Thus it is necessary to be able to rotate the gem in front of the aperture 33 so as to be able to observe it along different crystallographic axes.

Having described my invention in detail with respect to certain embodiments thereof, I do not desire to limit it to the exact details set forth except insofar as they are defined by the following claims.

What I claim is:

1. A foldable device for use in the examination of transparent or translucent gem materials with polarized light, said device being adapted to be held up to an eye of the observer so that the gem material may be manipulated in the device and inspected in polarized light, the combination comprising a frame having a front member, an eye piece and a back member, means for pivotally supporting said front member on one end of said back member and means for pivotally supporting said eye piece on the other end of said back member, said eye piece and said back member being shaped to be foldable into said front member, said front member having the central portion thereof cut out for admitting light into the device therethrough, a light polarizing element, means for removably supporting said light polarizing element over the central cut out portion of said front member for polarizing light admitted into the device therethrough, a second light polarizing element, means attached to the inner side of said eye piece for removably supporting said second light polarizing element, said first mentioned and said second light polarizing elements being supported with the light polarizing planes thereof crossed so that gem materials supported and rotated therebetween may be examined to determine whether they are singly or doubly refractive when said front member of said device is pointed in the direction of a light source and held with said eye piece up to an eye of the observer.

2. A device as set forth in claim 1 further characterized in that said front member comprises side panels having channels formed in the inner faces thereof, said channels having surfaces for engaging the first mentioned light polarizing element and forming the means for removably supporting said first mentioned light polarizing element.

3. A device as set forth in claim 2 further characterized in that the means for removably supporting said second light polarizing element comprises a pair of spaced cleats attached to inner surfaces of said eye piece for clamping said second light polarizing element against said eye piece.

4. A device as set forth in claim 3 further characterized in that the distance between the channels formed in the inner surfaces of said side panels is substantially equal to the width of said first mentioned light polarizing element which is substantially different from the length of said first mentioned light polarizing element so that said first mentioned light polarizing element may be inserted into said channels only with its light polarizing direction oriented in a predetermined direction the distance between said cleats attached to said eye piece also being substantially equal to the width of said second light polarizing element which is substantially different from the length thereof whereby said second light polarizing element when inserted between said cleats to be supported on said eye piece is supported so that its light polarizing direction is substantially at right angles to the light polarizing direction of said first mentioned light polarizing element.

5. A device as set forth in claim 4 further characterized in that the light polarizing elements are of such size that they do not interfere with the folding of the frame when they are positioned therein.

References Cited in the file of this patent

UNITED STATES PATENTS

| | | |
|---|---|---|
| 324,560 | King | Aug. 18, 1885 |
| 1,744,485 | Michel | Jan. 21, 1930 |
| 2,326,319 | Bailey | Aug. 10, 1943 |
| 2,494,078 | Woodruff | Jan. 10, 1950 |
| 2,497,070 | Coleman | Feb. 14, 1950 |
| 2,499,788 | Shore | Mar. 7, 1950 |
| 2,533,747 | Thienemann | Dec. 12, 1950 |
| 2,713,807 | Herbert | July 26, 1955 |